(12) United States Patent
Marks et al.

(10) Patent No.: US 9,374,580 B2
(45) Date of Patent: Jun. 21, 2016

(54) SYSTEM AND METHOD FOR INSERTION OF A PROGRAM CLOCK REFERENCE DURING PACKETIZATION OF AN ENCODED DATA STREAM

(75) Inventors: Ian Marks, Hampshire (GB); Ryan Spicer, Hampshire (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 505 days.

(21) Appl. No.: 13/816,788

(22) PCT Filed: Aug. 23, 2010

(86) PCT No.: PCT/EP2010/062253
§ 371 (c)(1),
(2), (4) Date: Apr. 22, 2013

(87) PCT Pub. No.: WO2012/025139
PCT Pub. Date: Mar. 1, 2012

(65) Prior Publication Data
US 2013/0202027 A1    Aug. 8, 2013

(51) Int. Cl.
*H04N 11/02* (2006.01)
*H04N 19/68* (2014.01)
*H04N 21/236* (2011.01)
*H04N 21/242* (2011.01)
*H04N 21/43* (2011.01)
(Continued)

(52) U.S. Cl.
CPC ......... *H04N 19/00872* (2013.01); *H04N 19/68* (2014.11); *H04N 21/236* (2013.01); *H04N 21/242* (2013.01); *H04N 21/4302* (2013.01); *H04N 21/434* (2013.01); *H04N 21/8547* (2013.01)

(58) Field of Classification Search
USPC ........................................ 375/240.02–240.29
See application file for complete search history.

(56) References Cited

U.S. PATENT DOCUMENTS 6,546,013 B1 *  4/2003  Huang et al. ............... 370/395.1
7,215,671 B1    5/2007  Karasawa
(Continued)

FOREIGN PATENT DOCUMENTS

EP         0 881 838      12/1998
WO         WO 01/61866     8/2001

OTHER PUBLICATIONS

International Organization for Standardisation, ISO/IEC JTC1/SC29/WG11 N0801, Information Technology—Generic Coding of Moving Pictures and Associated Audio: Systems, Recommendation H.222.0, ISO/IEC 13818-1, International Standard, Nov. 1994, 161 pages.
(Continued)

*Primary Examiner* — Leron Beck
(74) *Attorney, Agent, or Firm* — Baker Botts, LLP

(57) ABSTRACT

There is provided a method for clock reference insertion during packetization of an encoded data stream, wherein said packetization is performed before buffering of the data stream. The method comprises storing the value of each bit rate applied during encoding, and the duration of time for which each bit rate is applied. A clock reference time interval is converted into a clock reference data interval using the value of each bit rate applied and the duration of time for which each bit rate is applied. The clock reference data interval is used to determine where to insert a clock reference into the data stream during packetization.

15 Claims, 4 Drawing Sheets

(51) Int. Cl.
*H04N 21/434* (2011.01)
*H04N 21/8547* (2011.01)

(56) References Cited

U.S. PATENT DOCUMENTS

2002/0087999 A1* 7/2002 Kashima .................. 725/100
2006/0034375 A1* 2/2006 Ward ................ H04N 1/23424
375/240.28

OTHER PUBLICATIONS

ETSI TS 102 154 V1.2.1, Digital Video Broadcasting (DVB); Implementation guidelines for the use of Video and Audio Coding in Contribution and Primary Distribution Applications based on the MPEG-2 Transport Stream May 2004, 73 pages.

International Search Report for PCT/EP2010/062253, dated Nov. 26, 2010.

* cited by examiner

SYSTEM AND METHOD FOR INSERTION OF A PROGRAM CLOCK REFERENCE DURING PACKETIZATION OF AN ENCODED DATA STREAM

This application is the U.S. national phase of International Application No. PCT/EP2010/062253 filed 23 Aug. 2010 which designated the U.S., the entire content of which is hereby incorporated by reference.

TECHNICAL FIELD

The present application relates to a method for clock reference insertion during packetization of an encoded data stream, an encoding apparatus, and a computer-readable medium.

BACKGROUND

Conventional video compression systems such as MPEG-2 and MPEG-4 require that the encoders and decoders are synchronized. The system specifications defined by MPEG make provision for synchronizing the clocks at encoder and decoder. For historical reasons the master system clock frequency is set at 27 MHz and it is this clock that is locked at each end of a system. The parameter Program Clock Reference (PCR) is a code derived from the encoder 27 MHz clock that is inserted into a coded bit stream that enables a decoder to keep its internal clock locked to that of the encoder.

It is typical of television broadcast networks that during the video compression encoding process the variable amount of information required adequately to represent the television pictures being transmitted has to be matched to a constant available transmission capacity. Such systems are known as Constant Bit Rate (CBR) systems. The matching of input and output bit rates is achieved by means of a rate buffer into which the compressed video is placed prior to its transmission. For a given set of coding parameters the delay though this rate buffer will vary and, in conventional PCR insertion methods this will affect the PCR frequency and regularity.

More advanced systems use a multiplex of a plurality of channels and statistical multiplexing to combine the plurality of channels into a multiplex having a substantially constant bit rate. Statistical multiplexing helps to avoid the quality loss and inefficient use of available output capacity present in fixed share systems. Statistical multiplexing allows a group of encoders to share a fixed total common bit rate, but instead of allocating a fixed bit rate to each encoder, a bit rate controller dynamically allocates different bit rates to each encoder dependant upon the instantaneous bit rate demand of the respective input video data streams. Such a system allows each channel to have a variable bit rate (VBR) but these still require that the PCRs are inserted appropriately according to specification.

The MPEG and DVB system specifications are defined in: ISO/IEC 13818-1, "Generic Coding of Moving Pictures and Associated Audio Systems"; and DVB/ETSI TS 102 154, "Implementation guidelines for the use of video and audio coding in contribution and primary distribution applications based on the MPEG-2 transport stream". Both of these documents are incorporated herein by reference.

According to the MPEG and DVB system specifications the PCR needs to be inserted into an MPEG transport stream at regular intervals with a defined maximum time lapse between insertions. Compliant decoders are designed to work correctly within the limits set by this timing arrangement. Although practical decoders can be tolerant to variations in the rate and positioning of the PCR, to accommodate all decoders it is appropriate that the PCR is regular and occurs at a minimum frequency (or maximum time interval). In particular it is important that any two PCRs are not placed too close together even if the average rate meets the minimum requirement.

The MPEG/DVB Transport Stream (TS) has a defined packet based structure the syntax of which has provision to carry important system data, such as the PCR, as well as the encoded video, audio and other service elements. It is efficient to insert PCRs into adaptation fields in the packet headers provided by this syntax.

Traditionally, the construction of packetized MPEG TS has been done after the rate buffer where the output bit rate is typically constant, achieved because the rate buffer evens out the variations in encoder output. In such a system a simple method of PCR insertion is possible whereby the PCRs are inserted at regular time intervals under the control of a timer set at the required rate. This scheme has been adequate because generally the syntax of the TS consumes a small part of the total output bit rate. This has meant that historically this method of PCR insertion has not been a critical element in practical system design—where the ratio of payload to system syntax is a consideration.

However, as coding performance has increased and reductions in bit rate for a given video quality have been achieved, the proportion of the TS taken up by system syntax has steadily increased. Worthwhile gains can be made in performance by managing the PCR insertion process more carefully than before.

Typically, TS packetization is performed after a rate buffer, so that the packetization is performed on the elementary stream (ES) produced by the encoder after the rate of the ES has been smoothed. However, improvements in the efficiency of bandwidth utilization can be made if TS packetization is performed immediately after encoding, so before the rate buffer rather than after it.

Where TS packetization is performed after a rate buffer, the output bit rate from each packetizer can vary from the bit rate allocated to it by the bit rate controller by +/−3%. Accordingly, when the multiplexer allocates bandwidth to each stream in such a system, the multiplexer must leave a bandwidth margin to absorb this fluctuation from each stream. This margin is wasteful and inefficient.

Packetization pre-rate buffer is more efficient because the output bit rate from the rate buffer is exactly equal to the bit rate allocated to that stream by a bit rate controller. Therefore when a multiplexer has to aggregate all components from multiple streams to form a single multiplex, the sum equals an expected value with no variation. Because of this exactness, the bit rate controller can allocate all available bandwidth to the streams, without leaving a margin for variation, thus increasing bandwidth efficiency and having a positive impact on picture quality.

However, when TS packetization occurs before the rate buffer the process for inserting PCRs is much more complicated. This is because the PCR insertion must now take account of the delay of the encoded video data through the rate buffer.

Market demands require that the next generation of video compression encoders must take advantage of any means of improving transmission efficiency, in particular PCR insertion.

The present application provides a method and apparatus for improved PCR insertion.

SUMMARY

This document introduces a new method for controlling the insertion of PCRs into a TS when the TS packet encapsulation is performed prior to a buffer.

The data rate of the bytes that make up the packets of the transport stream leaving the packetizer are bursty in nature. For example, because it is coding a television frame picture without reference to any other frames, an I-frame (Intra Coded Video Frame) may produce a large number of bytes in a short period of time (high data rate). In a typical Group of Pictures (GOP) structure this I frame will be followed by several P frames (Forward Predicted Coded Video Frame) that will need many fewer bits because they takes advantage of coding the differences between successive pictures by making reference to the other pictures. In between these P frames will normally be B Frames (Bidirectionally Predicted Coded Video Frame) where an even lower data rate is generated. Consequently, the data entering the buffer has a variable bit rate but the variation is removed by means of the buffer so that the data leaving the buffer is at a predictable constant rate. Even in systems that use a VBR transmission or recording method the buffer acts as a means of managing any mutual asynchronism between the variable input and output rates.

The disclosed new method calculates, for each byte coming out of the TS packetizer, an expected time that that byte will take in leaving the buffer. The method then requires the addition of the times for each successive byte between PCRs, and generates an insert_PCR signal for the packetizer when the total accrued time reaches a preset PCR time interval. This is then repeated for as long as the system is running. In this way a PCR time interval is converted into a PCR bit interval which is used to insert the PCRs at relevant packet positions in the transport stream such that after passing through the buffer, the PCRs are at the correct time intervals in the output stream.

Thus, the present document presents a mechanism for improved PCR insertion. PCRs are inserted before the buffer in such a way that they appear in the output TS, post buffer, evenly spaced in time and at the minimum required rate.

Accordingly, there is provided a method for clock reference insertion during packetization of an encoded data stream, wherein said packetization is performed before buffering of the data stream. The method comprises: storing the value of each bit rate applied during encoding, and the duration of time for which each bit rate is applied; converting a clock reference time interval into a clock reference data interval using the value of each bit rate applied and the duration of time for which each bit rate is applied; and using the clock reference data interval to determine where to insert a clock reference into the data stream during packetization.

By converting the clock reference time interval into a clock reference data interval, the clock reference can be inserted during packetization, taking advantage of the packet structure to optimally carry the clock reference, but before buffering, meaning that the bit rate of the stream sent to the multiplexer can be accurately controlled.

The method may further comprise receiving video data; and encoding the received video data at the applied bit rate to generate the data stream. The bit rate applied during encoding may be an allocated bit rate. The allocated bit rate may be allocated by a bit rate controller.

The method may further comprise packetizing the data stream to generate a transport stream; and buffering the transport stream. The bit rate of the stream after buffering may be substantially equal to the bit rate applied during encoding.

The method may further comprise, upon the sum of the stored durations being greater than or equal to a clock reference time interval: calculating a clock reference data interval from the sum of the products of the bit rate value applied and its respective duration; storing the clock reference data interval; erasing the stored values of each bit rate applied and the duration of time for which each bit rate is applied.

A plurality of clock reference data intervals may be calculated and stored in a memory until needed. After each clock reference data interval is calculated, the bit rate values and durations that were used to calculate it may be deleted.

The method may further comprise, upon the sum of the stored durations being greater than or equal to a clock reference time interval: the value of any remainder duration for the last applied bit rate in excess of the clock reference time interval is stored together with the value of the bit rate. In this way, the method accounts for the eventuality of a clock reference data interval falling during the duration of a particular bit rate.

The method may further comprise monitoring the volume of data packetized; and generating a clock reference insertion instruction when the volume of data packetized since the last clock reference insertion is equal to the oldest entry in the stored values of the clock reference data interval. A clock reference may thus be inserted into the stream at the appropriate interval.

There is further provided an encoding apparatus wherein packetization of a data stream is performed before buffering of the data stream. The encoding apparatus comprising a first memory, a processor, and a clock reference generator. The first memory is arranged to store the value of each bit rate applied by an encoder and the duration of time for which each bit rate is applied. The processor is arranged to convert a clock reference time interval into a clock reference data interval using the value of each bit rate applied and the duration of time for which each bit rate is applied. The clock reference generator arranged to use the clock reference data interval to determine where to insert a clock reference into the data stream during packetization.

The encoding apparatus may further comprise: an input arranged to receive video data; and an encoder arranged to encode said video data at the applied bit rate.

The encoding apparatus may further comprise: a packetizer arranged to packetize the encoded video data; and a buffer arranged to buffer the packetized video data.

The processor may be further arranged to: determine when the sum of the stored durations is greater than or equal to a clock reference time interval: calculate a clock reference data interval from the sum of the products of the bit rate value applied and its respective duration; store the clock reference data interval in a second memory (FIFO); erase the values stored in the first memory.

The processor may be further arranged to: store the value of any remainder duration for the last applied bit rate, the remainder in excess of the clock reference time interval, together with the value of the respective bit rate, in the first memory.

The encoding apparatus may further comprise a clock reference generator arranged to: monitor the volume of data packetized; and generate a clock reference insertion instruction when the volume of data packetized since the last clock reference insertion is equal to the oldest entry in the stored values of the clock reference data interval.

There is further provided a computer-readable medium, carrying instructions, which, when executed by computer logic, causes said computer logic to carry out any of the methods described herein.

BRIEF DESCRIPTION OF THE DRAWINGS

A method of clock reference insertion and an encoding apparatus will now be described, by way of example only, with reference to the accompanying drawings, in which.

DETAILED DESCRIPTION

Figure 1:
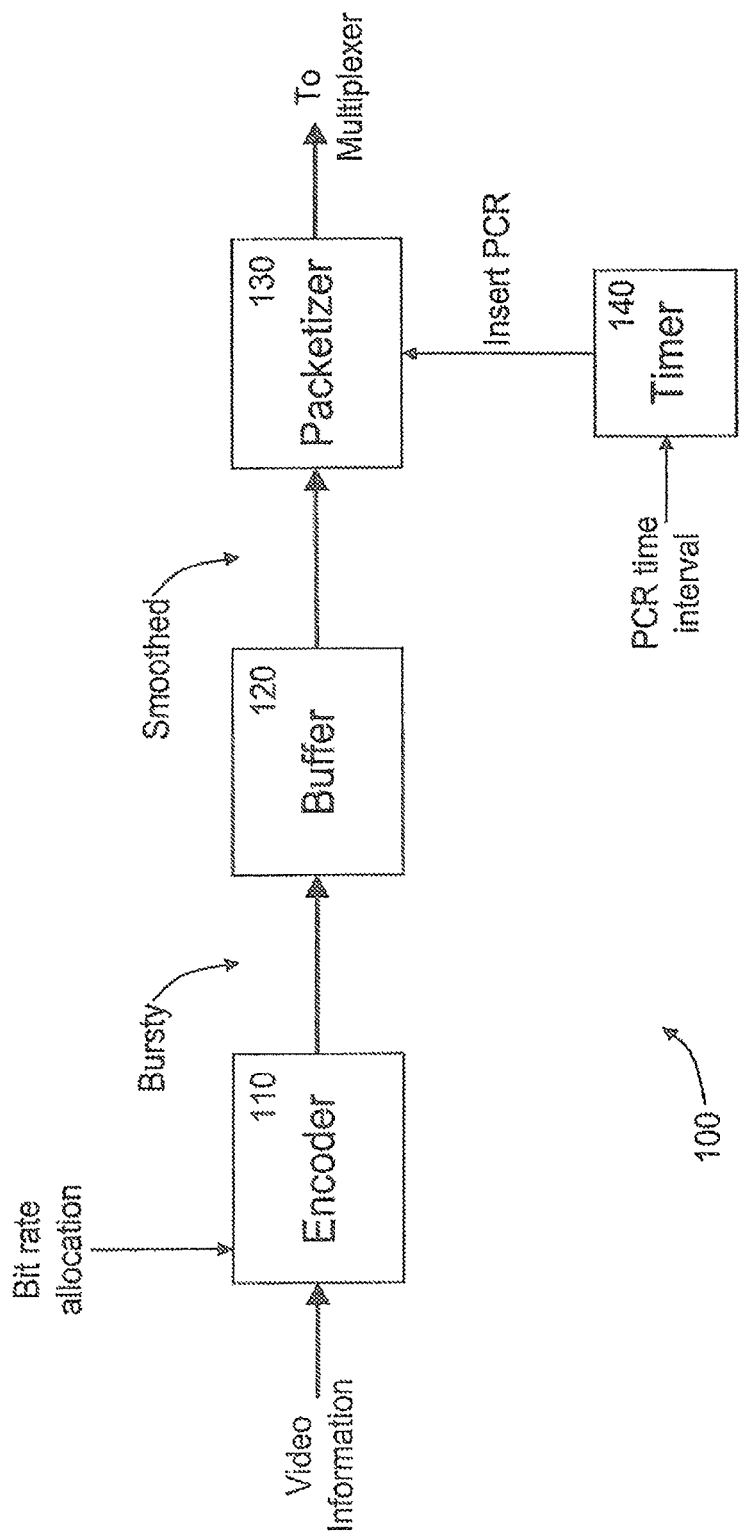
FIG. 1 shows a known encoding apparatus.

FIG. 1 shows a known encoding apparatus 100. An encoder 110 receives video information and a bit rate allocation. The bit rate allocation is received from a bit rate controller. The encoder 110 encodes the received video information and passes this to a buffer 120. Although encoded according to the allocated bit rate, the encoded video information stream is bursty in nature, meaning that the bit rate changes abruptly. This can be due to the encoding standard used. For example, a video frame encoded according to MPEG-2 can be encoded as an I frame, P frame or B frame. An I frame requires a relatively large amount of data to encode, a P frame requires somewhat less data and a B frame requires less data still. The encoding process will output different types of frames, and this will affect the instantaneous bit rate output by the encoder 110. Further, the amount of detail or complexity in the frame that is encoded will also impact the instantaneous bit rate output by the encoder 110.

The encoded video information from the encoder 110 is passed to a buffer 120, which smoothes the received encoded video information stream and outputs it at a bit rate according to the bit rate allocation. The smoothed encoded video information is then passed to a packetizer 130. The packetizer 130 packetizes the received stream to generate a transport stream suitable for multiplexing. During packetization, a timer 140 is used to monitor a PCR time interval and generate an insert Program Clock Reference (PCR) instruction which is sent to the packetizer 130 at the appropriate time. PCRs may thus be inserted into the transport stream at regular time intervals according to a PCR time interval received by the timer 140.

Figure 2:
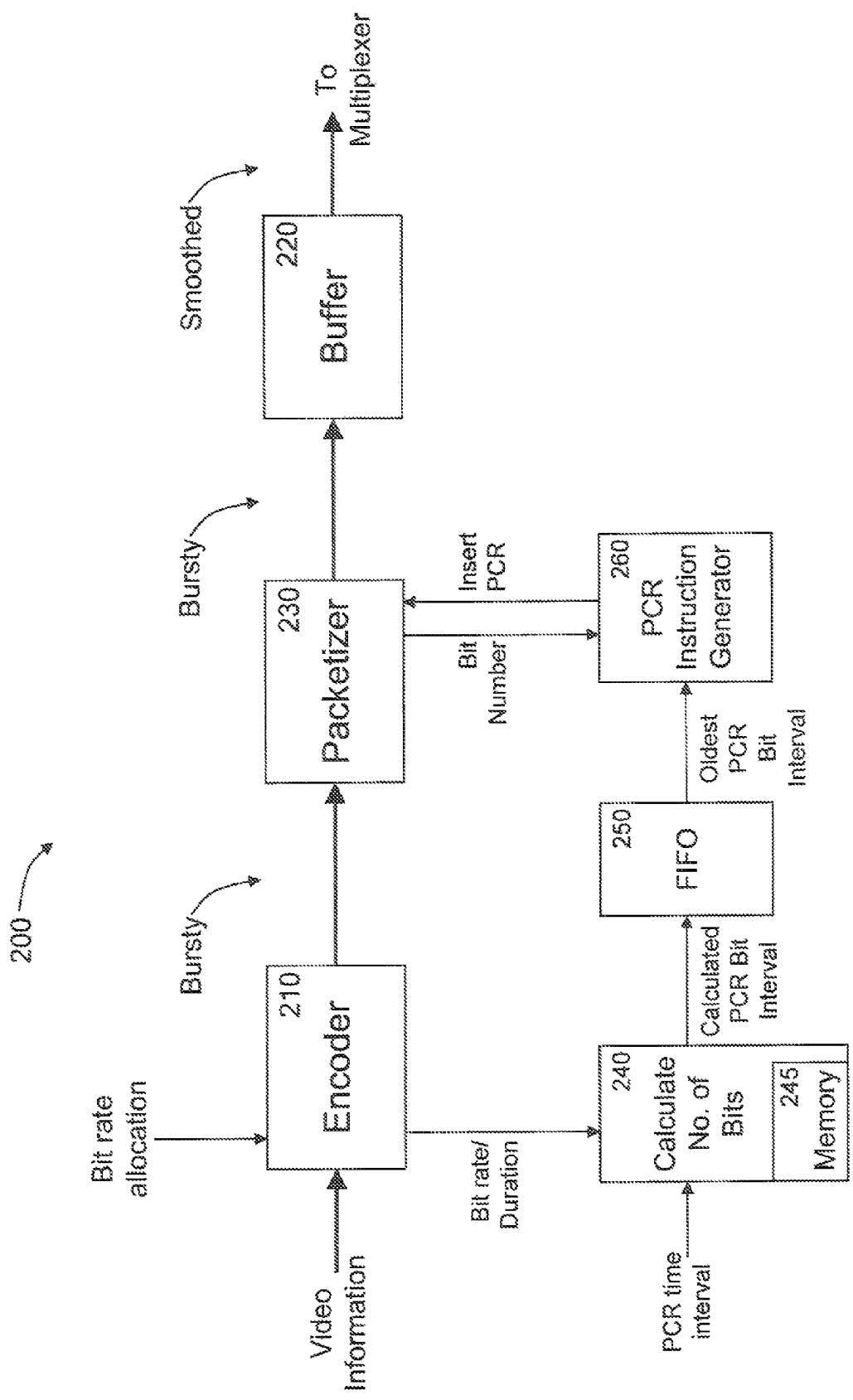
FIG. 2 shows an encoding apparatus as disclosed herein.

FIG. 2 shows a encoding apparatus 200 as disclosed herein. A difference between encoding apparatus 100 and encoding apparatus 200, is that in the latter the Packetizer 230 comes before the buffer 220, as opposed to the former where packetizer 130 follows buffer 120.

As explained above, packetization pre-buffer is efficient because the output bit rate from the buffer 220 is equal to the bit rate allocated to that stream by a bit rate controller. Therefore when a multiplexer aggregates all components from multiple streams to form a single multiplex, the sum equals an expected value with no variation. Because of this exactness, the bit rate controller can allocate all available bandwidth to the streams, without leaving a margin for variation, thus having a positive impact on picture quality. However, when TS packetization occurs before the buffer 220 the process for inserting PCRs is more complicated. This is because the PCR insertion must now take account of the delay of the encoded video data through the buffer 220. The apparatus shown in FIG. 2 provides a solution to this problem.

An encoder 210 receives video information and a bit rate allocation. The bit rate allocation is received from a bit rate controller. The encoder 210 encodes the received video information and passes this to a packetizer 230. The packetizer 230 packetizes the encoded stream to generate a transport stream. The encoded video information is bursty and so the packetized transport stream output by the packetizer 230 is also bursty, and so not suitable for multiplexing. The packetized transport stream is output from the packetizer 230 and passed to a buffer 220, which smoothes the bit rate of the transport stream and outputs it to a multiplexer at a bit rate according to the bit rate allocation.

During packetization, Program Clock References (PCRs) are inserted into the transport stream. In addition to the encoder 210, packetizer 230 and buffer 220, there is provided a calculate number of bits process block 240, a FIFO 250 and a PCR instruction generator 260. The calculate number of bits process block 240 includes a memory 245. The calculate number of bits process block 240 receives a PCR time interval from the bit rate controller or another component, and also receives from encoder 210 an indication of the encoding bit rate and the duration of each encoding bit rate.

When the encoder 210 is working in variable bit rate mode (for example in a multi-channel system that implements statistical multiplexing) the bit rate that the multiplexer is able to receive from the buffer 220 varies with time. This variability affects the PCR spacing and so this must be managed. The required time between PCR fields in the transport stream is expressed as the parameter PCR time interval.

All bit rate values, $BR_n$, that the encoder uses, along with the duration $DUR_n$ of each valid bit rate value, are stored in the memory 245 by the calculate number of bits process block 240. These values are stored as shown in the following table and are used to calculate the number of bits between PCRs, referred to as a PCR bit interval.

| Bit rate (BR) | Duration (DUR) |
|---|---|
| $BR_1$ | $DUR_1$ |
| $BR_2$ | $DUR_2$ |
| $BR_3$ | $DUR_3$ |
| ... | ... |
| $BR_n$ | $DUR_n$ |

The value of the running total of the duration values is also stored. A calculation is performed which converts the bit rates and PCR interval values into a series of PCR bit interval values which are stored in the FIFO 250 until they are needed.

The calculate number of bits process block 240 performs the following calculation when the running total of durations meets or exceeds the PCR time interval:

$$\text{PCR\_bit\_interval} = \sum_{n=1}^{table\_size} BR_n \times DUR_n$$

Each calculated PCR bit interval is made available to the PCR instruction generator 260 at the appropriate time by the FIFO 250. The FIFO 250 is a first-in first-out memory used to buffer the calculated PCR bit intervals ready for when they are required by the PCR instruction generator 260.

There is also feedback (not shown in FIG. 2) of the fill level from the FIFO 250 to the calculate number of bits process block 240 which is used to ensure that the fill level of FIFO 250 is maintained between empty and full.

The PCR instruction generator 260 counts the valid TS bits coming out of the packetizer 230 and when the count reaches the value of the oldest calculated PCR bit interval an "insert PCR" signal is generated and sent to the packetizer 230, then the next oldest PCR bit interval value is fetched from the FIFO 250 and a new count begins. When the oldest value in FIFO 250 is read by PCR instruction generator 260, that value is deleted from FIFO 250. Upon receipt of the insert PCR signal from the PCR generator 260, the packetizer 230 inserts a PCR into the transport stream.

Figure 3A:
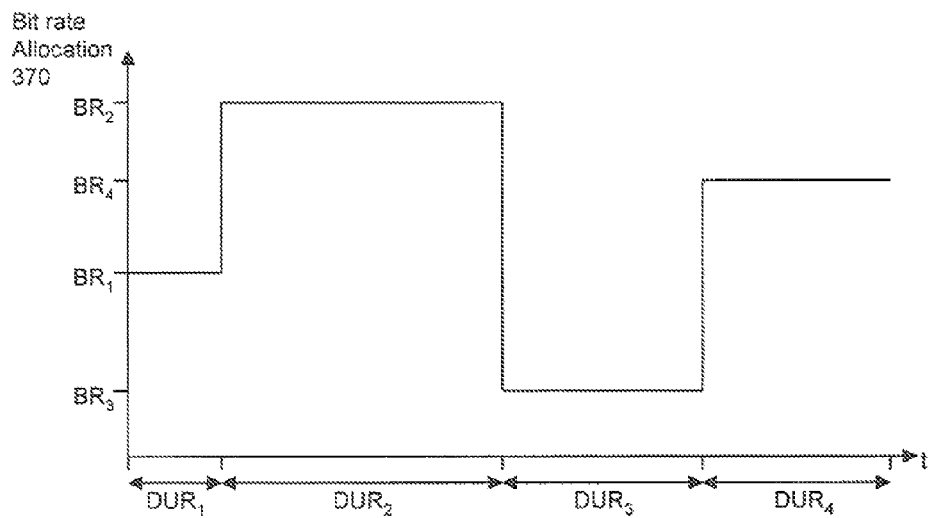
FIGS. 3 a, b and c show the relationship between the bit rate allocation, encoder output bit rate and buffer output bit rate respectively.
Figure 3B:
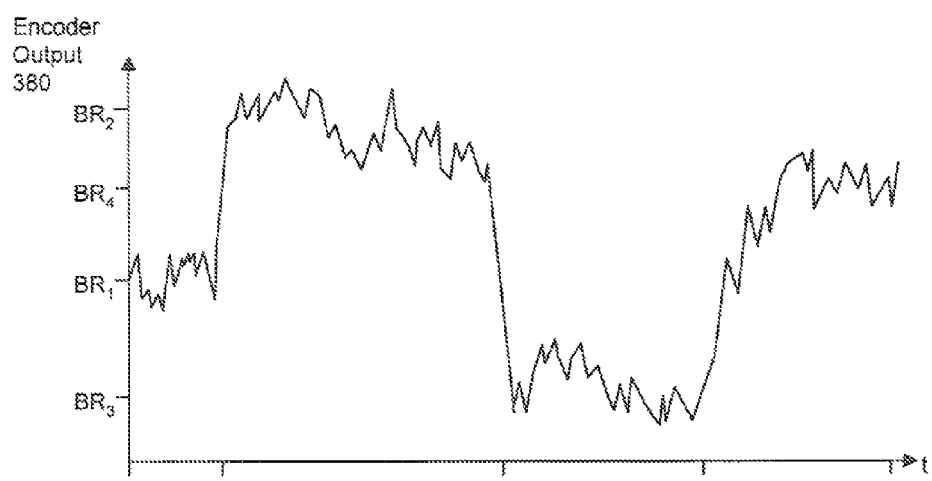
Figure 3C:
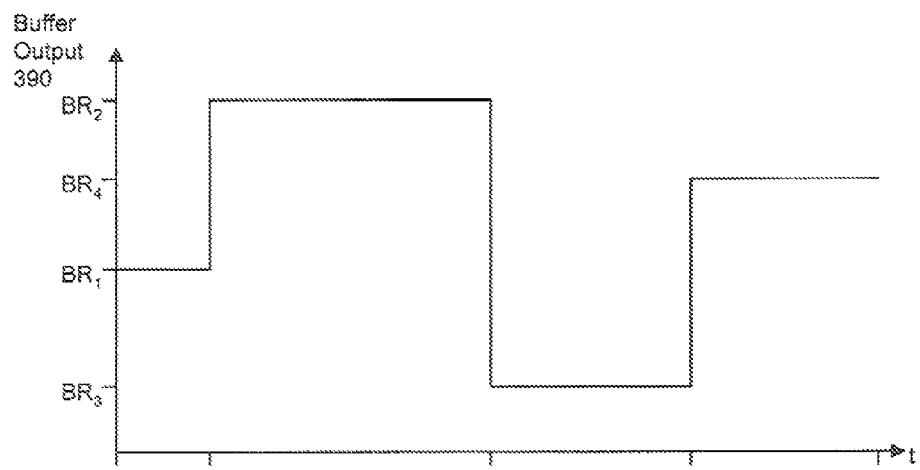

FIGS. 3 *a, b* and *c* show the relationship between the bit rate allocation, encoder output bit rate and buffer output bit rate respectively. Bit rate is shown in a vertical axis and time on a horizontal axis. FIG. 3*a* shows the first four discrete allocated bit rate values $BR_n$ of a series together with their respective durations $DUR_n$. FIG. 3*b* shows the corresponding encoder output 380, which is bursty and loosely follows the allocated bit rate 370. FIG. 3*c* shows the Buffer output bit rate 390 which exactly follows the bit rate allocation 370.

Figure 4:
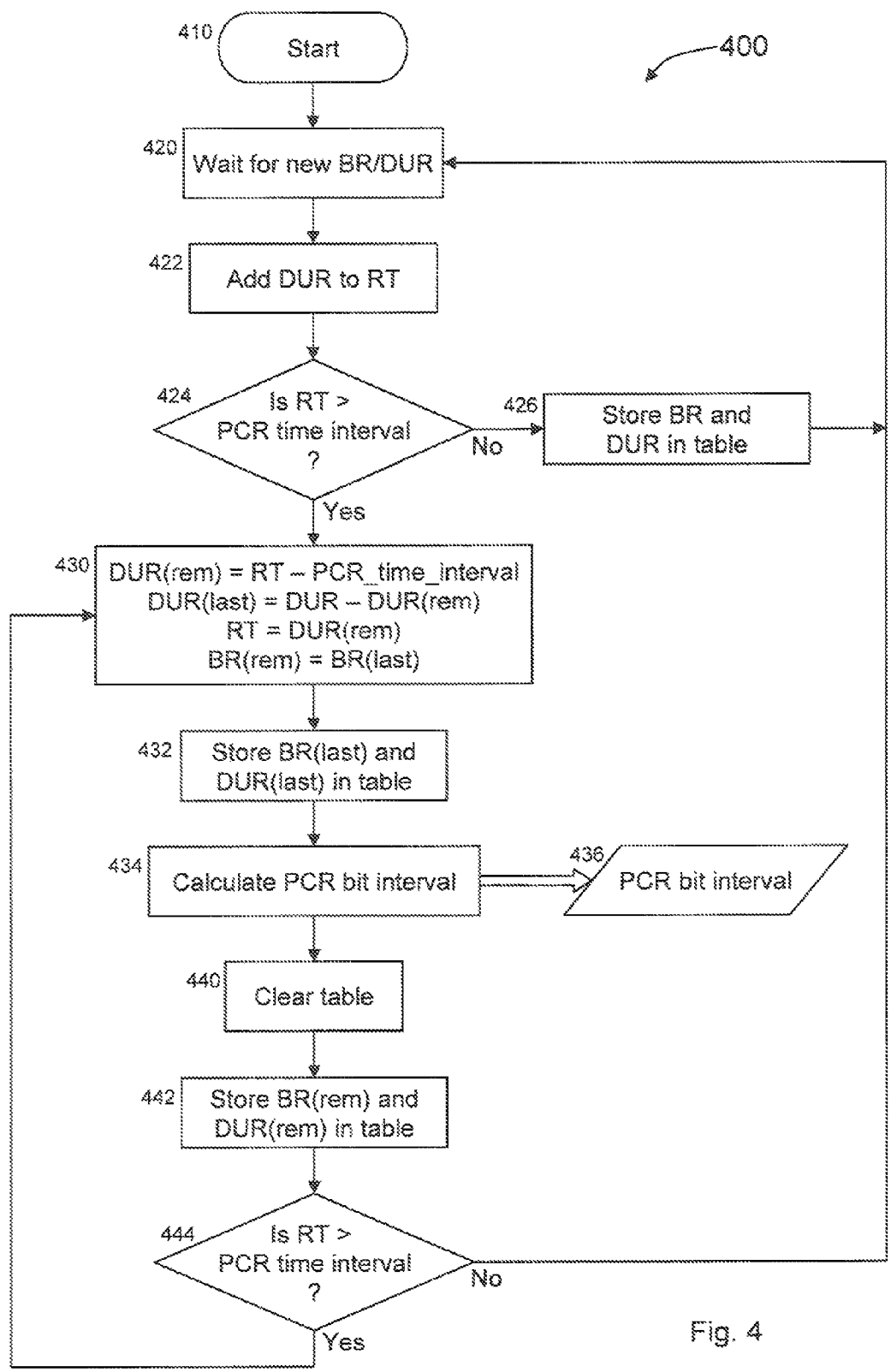
FIG. 4 illustrates the method for clock reference insertion disclosed herein.

FIG. 4 illustrates the method 400 of converting a clock reference time interval to a clock reference data interval as used in the clock reference insertion method and encoding apparatus disclosed herein. The method starts 410 and waits 420 for a new bit rate value (BR) and duration value (DUR) to be determined. Upon receipt of a new bit rate and duration pair, the value of the duration (DUR) is added 422 to a running total (RT). It is then determined 424 whether the running total (RT) of durations (DUR) exceeds the PCR time interval. If it does not, then the received bit rate value (BR) and duration value (DUR) are stored 426 in a table, and the process waits 420 for a further bit rate value (BR) and duration value (DUR) pair.

If it is determined 424 that the running total (RT) of durations is greater than the PCR time interval, then calculations are made 430 to correctly apportion bit rate and bit rate duration values to the appropriate PCR time interval. A duration remainder DUR(rem) is calculated as the final running total (RT) less the PCR time interval; the last duration value for the table DUR(last) is calculated as the final received duration value less the duration remainder DUR(rem). A new running total (RT) is equal to DUR(rem). The bit rate for the remainder portion BR(rem) is equal to the bit rate for the last portion BR(last) which are both equal to the final received bit rate value.

The last duration value for the table DUR(last) and the associated bit rate value BR(last) are stored 432 in the table. A PCR bit interval is calculated 434 as the sum of the products of each pair of bit rate (BR) and duration (DUR) values stored in the table. The calculated PCR bit interval is output 436 and stored in a FIFO 250 as explained above.

After the calculation 434 and output 436 of a PCR bit interval, the table is cleared 440. Then, the remainder values for bit rate BR(rem) and duration DUR(rem) are stored 442 in the table. A determination 444 is made as to whether the new running total (equal to DUR(rem)) is greater than the PCR time interval. This is possible if the last received bit rate duration is longer than the PCR time interval. If the new running total is greater than the PCR time interval then the process repeats the series of calculations 430 and subsequent processes 432 to 442. If the new running total is not greater than the PCR time interval then the process again waits 420 for a new bit rate value (BR) and duration value (DUR) to be determined.

The disclosed system enables the insertion of PCRs into a transport stream at accurately controlled intervals in a system where the buffer is arranged after the transport stream packetization stage. Accurate PCR intervals are important since they ensure that the transport streams are compliant with appropriate standards while minimizing the number of bits used for PCR fields and hence maximizing the bandwidth available for providing improved video quality.

The disclosed method and apparatus provide a solution which is able to insert PCRs into a transport stream so they are at regular time intervals in the output and at the correct rate even when the packetization is performed pre-buffer. The method, when implemented in practical encoder products, can easily be detected by analysing recorded transport streams at an output post-buffer, which is generally easily accessible. The transport stream may be analysed with an MPEG test instrument such as the Dektek StreamXpert or WWG DTS-300. In a recording of a transport stream that contains PCRs inserted according to the disclosed method, the interval between PCRs varies slightly depending on the configuration of the encoder and the type of material fed into the encoder. This slight variation in PCR interval is presently unique.

The cause of this phenomenon is the variation in the packetization process. In a traditional system (with post-buffer packetization) there is up to +/−3% variation in the bit rate of the output transport stream. The disclosed method provides a transport stream having an accurately controlled bit rate, but due to the packetization process the position of PCRs in the output stream is subject to around a +/−3% variation. This means that the allocated PCR time interval must be reduced slightly to ensure that any requirement for a maximum PCR time interval is met. However, because the output bit rate of the transport stream is accurately controlled by the buffer, no margin for variation is required in the bit rates allocated to the encoder of each information stream. It should be noted that the drawbacks of the requirement for a slightly higher PCR frequency to accommodate this variation are significantly outweighed by the ability of a statistically multiplexed system to distribute all bandwidth to available streams, without leaving a 3% margin for each stream.

It will be apparent to the skilled person that the exact order and content of the actions carried out in the method described herein may be altered according to the requirements of a particular set of execution parameters, such as speed of encoding, accuracy of detection, resolution of video sources, type of compression standards in use with the statistical multiplexing method, and the like. Accordingly, the order in which actions are described and/or claimed is not to be construed as a strict limitation on order in which actions are to be performed. Further, while the examples described herein are explained in the context of video encoding, the described methods and apparatus may be used in the encoding of any data, such as, for example, audio information.

The invention claimed is:

1. A method for clock reference insertion during packetization of an encoded data stream, the method comprising:

storing, by an encoding apparatus, a value of each bit rate applied during encoding and a duration of time for which each bit rate is applied;

converting, by the encoding apparatus, a clock reference time interval into a clock reference data interval using the value of each bit rate applied and the duration of time for which each bit rate is applied;

during packetization and before a buffering of the data stream by the encoding apparatus, using the clock reference data interval to determine where to insert a clock reference into the data stream during packetization buffering, by the encoding apparatus, the data stream after the insertion of the clock reference into the data stream; and upon the sum of the stored durations being greater than or equal to a clock reference time interval:

calculating a clock reference data interval from a sum of the products of the bit rate value applied and its respective duration;
storing the clock reference data interval; and
erasing the stored values of each bit rate applied and the duration of time for which each bit rate is applied.

2. The method of claim 1, further comprising:
receiving video data; and
encoding the received video data at the applied bit rate to generate the data stream.

3. The method of claim 2, further comprising:
packetizing the data stream to generate a transport stream; and
buffering the transport stream.

4. The method of claim 1, wherein the method further comprises, upon the sum of the stored durations being greater than or equal to a clock reference time interval:
the value of any remainder duration for the last applied bit rate in excess of the clock reference time interval is stored together with the value of the bit rate.

5. The method of claim 1, the method further comprising:
monitoring the volume of data packetized; and
generating a clock reference insertion instruction when the volume of data packetized since the last clock reference insertion is equal to the oldest entry in the stored values of the clock reference data interval.

6. An encoding apparatus wherein packetization of a data stream is performed before buffering of the data stream, the encoding apparatus comprising:
a first memory arranged to store a value of each bit rate applied during encoding by the encoding apparatus and a duration of time for which each bit rate is applied;
a processor operable to:
convert a clock reference time interval into a clock reference data interval using the value of each bit rate applied and the duration of time for which each bit rate is applied;
during packetization and before a buffering of the data stream by the encoding apparatus, use the clock reference data interval to determine where to insert a clock reference into the data stream during packetization;
after the insertion of the clock reference into the data stream, store the data stream in a buffer;
determine when the sum of the stored durations is greater than or equal to a clock reference time interval:
calculate the clock reference data interval from the sum of the products of the bit rate value applied and its respective duration;
store the clock reference data interval in a second memory; and
erase the values stored in the first memory.

7. The encoding apparatus of claim 6, further comprising:
an input arranged to receive video data; and
an encoder arranged to encode said video data at the applied bit rate.

8. The encoding apparatus of claim 7, further comprising:
a packetizer arranged to packetize the encoded video data; and
a buffer arranged to buffer the packetized video data.

9. The encoding apparatus of claim 6, wherein the processor is further arranged to:
store the value of any remainder duration for the last applied bit rate, the remainder in excess of the clock reference time interval, together with the value of the respective bit rate, in the first memory.

10. The encoding apparatus of claim 6, further comprising a clock reference generator arranged to:
monitor the volume of data packetized; and
generate a clock reference insertion instruction when the volume of data packetized since the last clock reference insertion is equal to the oldest entry in the stored values of the clock reference data interval.

11. A non-transitory computer-readable storage medium storing instructions, which, when executed by computer logic, causes said computer logic to:
storing a value of each bit rate applied during encoding and a duration of time for which each bit rate is applied;
converting a clock reference time interval into a clock reference data interval using the value of each bit rate applied and the duration of time for which each bit rate is applied;
using the clock reference data interval to determine where to insert a clock reference into the data stream during packetization;
calculating a clock reference data interval from a sum of the products of the bit rate value applied and its respective duration;
storing the clock reference data interval;
erasing the stored values of each bit rate applied and the duration of time for which each bit rate is applied.

12. The non-transitory computer-readable storage medium of claim 11, wherein the instructions are further executable by the computer logic is to cause the computer logic to:
receive video data; and
encode the received video data at the applied bit rate to generate the data stream.

13. The non-transitory computer-readable storage medium of claim 12, wherein the instructions are further executable by the computer logic is to cause the computer logic to:
packetize the data stream to generate a transport stream; and
buffer the transport stream.

14. The non-transitory computer-readable storage medium of claim 11, wherein the instructions are further executable by the computer logic is to cause the computer logic to:
determine that the sum of the stored durations is greater than or equal to a clock reference time interval; and
store the value of any remainder duration for the last applied bit rate in excess of the clock reference time interval together with the value of the bit rate.

15. The non-transitory computer-readable storage medium of claim 11, wherein the instructions are further executable by the computer logic is to cause the computer logic to:
monitor the volume of data packetized; and
generate a clock reference insertion instruction when the volume of data packetized since the last clock reference insertion is equal to the oldest entry in the stored values of the clock reference data interval.

* * * * *